United States Patent Office.

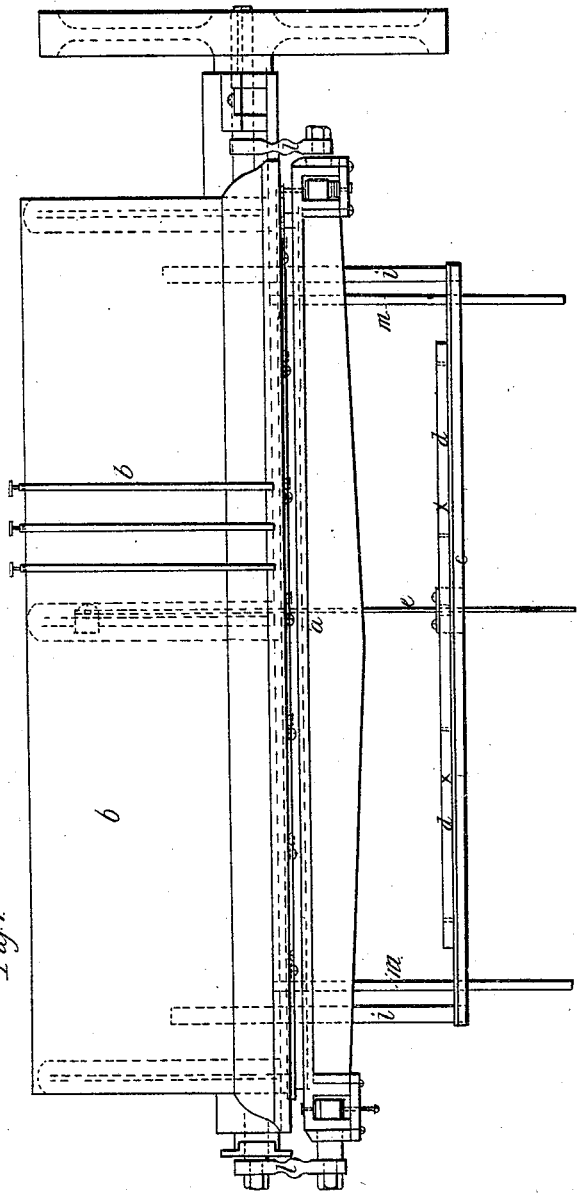

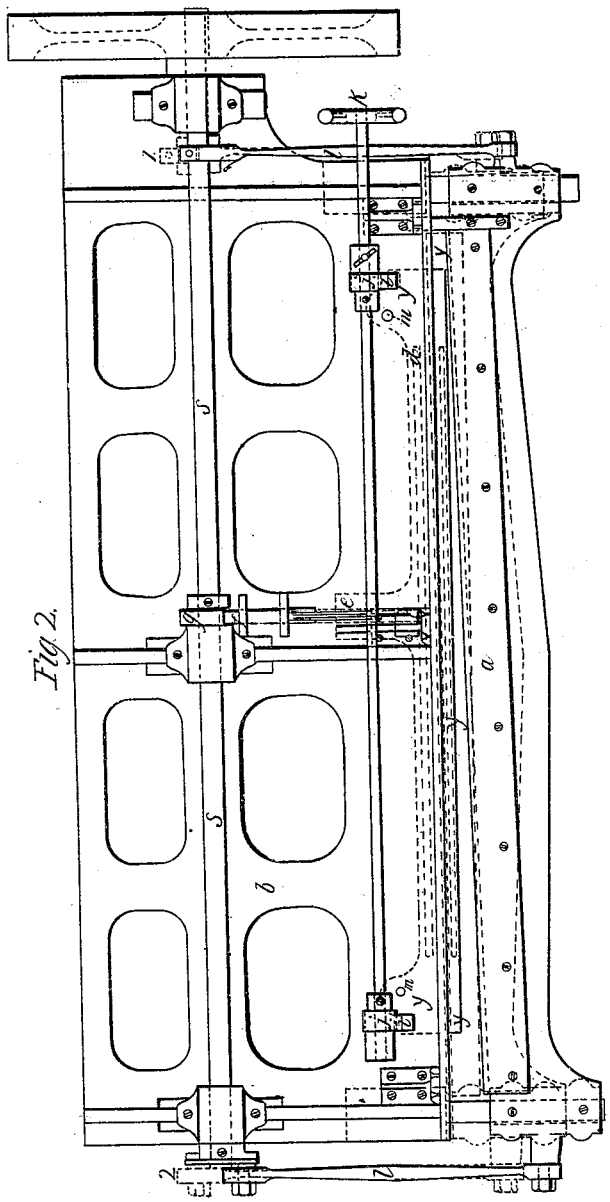

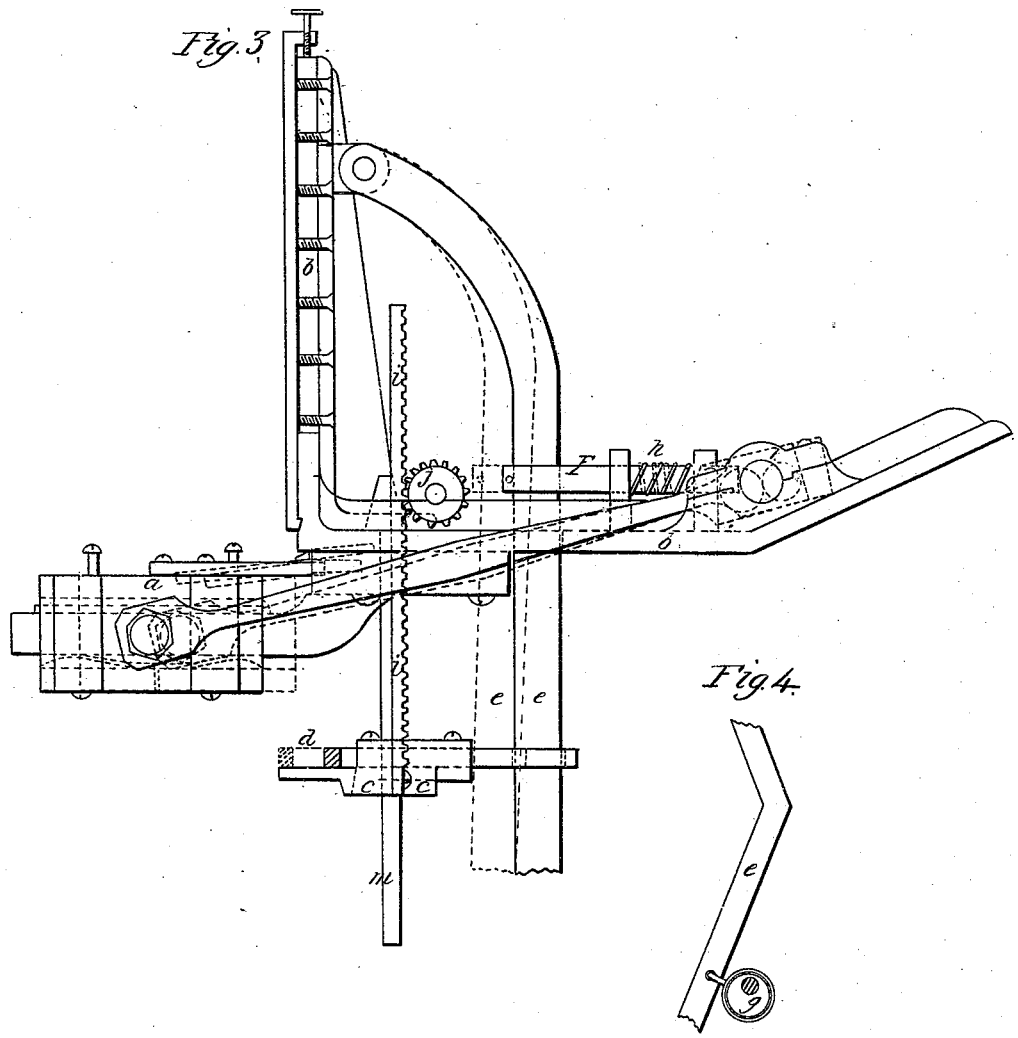

HENRY A. GAGE, OF MANCHESTER, NEW HAMPSHIRE.

Letters Patent No. 96,791, dated November 16, 1869.

IMPROVEMENT IN MACHINES FOR CUTTING PASTEBOARD.

The Schedule referred to in these Letters Patent and making part of the same.

Be it known that I, HENRY A. GAGE, of Manchester, county of Hillsborough, and State of New Hampshire, have invented a new and useful Improvement on a Machine for Cutting Cards and Card-Board, or Straw-Board or Pasteboard; and I do hereby declare that the following is a full, clear, and exact description of the construction and operation of the same, reference being had to the annexed drawings, making a part of this specification, in which—

Figure 1 is a longitudinal elevation.
Figure 2, a perspective view.
Figure 3, a transverse section.
Figure 4, a portion of lever $e$ and cam $g$.

Fig. 1 shows the moving knife $a$, the movable gauge $c$, and slide $d$, for removing the card, in combination with the lever $e$; the inclined table $b$, on which the card-board is placed previous to cutting, and the racks $i$, with the guides $m$, for moving and setting the gauge $c$; also the lever $l$, by which the knife $a$ is operated.

Fig. 2 shows the movable knife $a$ and stationary knife $y$, the levers $l$ $l$, and cranks 1 and 2, and the shaft S; also, the hand-wheel $k$, for moving the pinion $j$, and, by the racks $i$, setting the gauge $c$; also, the cam G and the rod $f$, attached to the lever $e$, by which the slide $d$ is worked to clear off the cards after cutting.

Fig. 3 shows the rack $i$ and pinion $j$, the guides $m$, the gauge $c$, the lever $e$, in connection with the rod $f$ and spring $h$, by which the slide $d$ is operated.

Fig. 4 shows the lever $e$, attached to the cam G without the spring $h$.

The machine is worked by means of the cranks 1 and 2, and the cam $g$ attached to the shaft S.

The cranks are attached to the knife $a$ by the levers $l$, and one being longer than the other, throw that end of the knife further than the other, so that when this movable knife is brought back, and comes in contact with the card-board, which has been placed on the inclined table $b$, and fallen down upon the gauge $c$, and against the stationary knife $y$, the board is cut at one end of the knife $a$, between it and the knife $y$, before the other is reached; i. e., a shear-cut is produced. The same result would be produced if the levers $l$ were of different lengths, and the cranks of equal lengths.

The card being cut, rests on the gauge $c$, when the movement of the slide $d$ throws it off.

What I claim, and desire to secure by Letters Patent, is—

1. The movable knife $a$, when adjusted and operated by levers or cranks of different lengths, or their equivalents, from main shaft, so as to produce a shear-cut, substantially as described and for the purpose set forth.

2. The combination of the lever $e$, the slide $d$, the cam $g$, and the rod $f$, with spring for clearing the card after it is cut.

H. A. GAGE.

Witnesses:
J. EDWIN STEARNS,
C. H. BARTLETT.